June 19, 1956 J. F. NEWCOMB 2,750,660
MECHANISM FOR AND METHOD OF CLINCHING NUTS
Filed Oct. 15, 1953 2 Sheets-Sheet 1

INVENTOR.
JOHN F. NEWCOMB
BY
Barnes, Kisselle, Laughlin & Raisch
ATTORNEYS.

June 19, 1956  J. F. NEWCOMB  2,750,660
MECHANISM FOR AND METHOD OF CLINCHING NUTS
Filed Oct. 15, 1953  2 Sheets-Sheet 2

INVENTOR.
JOHN F. NEWCOMB
BY
Barnes, Kisselle, Laughlin & Raisch
ATTORNEYS.

United States Patent Office 2,750,660
Patented June 19, 1956

2,750,660

MECHANISM FOR AND METHOD OF CLINCHING NUTS

John F. Newcomb, Huntington Woods, Mich.

Application October 15, 1953, Serial No. 386,224

4 Claims. (Cl. 29—432)

This invention relates to apparatus and method of punching flanged nuts through a metal panel and clinching the nut on the back of the panel all in one stroke. Heretofore flanged nuts have been applied to metal panels by first punching holes in the panel then placing the nuts in the holes and clinching the nuts on the backside of the panel by a separate staking operation. This involves three operations; namely, punching the hole in the panel, placing the nut in the hole, and then staking the unflanged portion of the nut on the back of the panel to complete the clinching operation.

An improvement of the three-operation method has lately been in use. This involves feeding the nuts by a chute to a stationary punch which has a magnet on the end and recess into which the nuts are fed through a chute. The panel is laid over the die and the punch then pushes the unflanged portion of the nut through the panel shearing a portion of the panel off in the die. Then the die is turned or indexed 45 degrees and the square nut is then so located that the edges of the die cross the corners of the nut. Then the die is pushed upwardly and the corners of the nut are staked or clinched.

My improved method and apparatus consists of providing a die which has sharp edges which conform to the shape of the body or the unflanged portion of the nut, but at several spots—at the corners in the case of a square nut—providing recesses or channels which have sharp nubs at the inner ends of the channels which are located in the hollow interior of the die and are located at the bottoms of the channels. The nuts are automatically fed to the punch through a flexible chute. The punch has the side which faces the ends of the chute cut away and the end of the punch has a rectangular recess at the bottom of which is implanted a small magnet. The side of the recess facing the end of the flexible chute is open. Each time the punch returns from a down stroke a nut is fed into the recess of the punch which then comes down again. The sharp edges of the die operating with the unflanged body of the nut shear a piece of the panel out of the panel. However, the piece of the panel at the ends of the nubs or channels is pushed into the recesses or channels in the die and as the nut enters and passes into the panel it encounters the sharp nubs at the ends of the channel. These nubs swedge or cut portions of the body of the nut off the sides and material so swedged is extruded into the channels of the die as the nut is punched through the panel. The extruded material from the nut is pressed into the material already in the channels that has been sheared from the panel. The two strips of material flow together in the extruding operation forming clinching tongues that bind the nut to the back of the panel. So there is combined all in one stroke of the punch, the perforating of the panel by the nut and die, the placing of the nut in the hole punched out, and the clinching of the nut on the back of the panel. With an automatic feeding of the nuts to the punch as previously described, the nuts can be applied to a panel as fast as 80 to 85 per minute. My setup can be used in the standard press, whereas the best previous method of applying nuts to panels requires expensive additions to a press in the way of hydraulic apparatus to index and to turn back the die and bringing the corners of the nut across the edges of the die.

Referring to the drawings.

Figure 1:
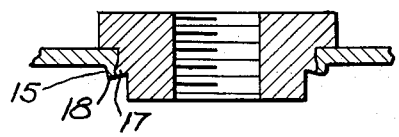
Fig. 1 is a section through a nut clinched to a panel by my apparatus and method.

The punch is a round punch 1 with one side 2 cut away to expose the nut receiving recess 3. This recess has a magnet 4 in its bottom which is insulated from the rest of the punch material by a brass bushing 5. In order to facilitate the machining of the square recess in the end of the punch, the channels 6 and 7 are machined in the end of the punch. They have no function other than making it easy to produce the rectangular recess in the end of the punch. The channel 8 is machined in the end of the punch in order to provide room for the magnet and the brass bushing which intersects the wall of the back of the recess.

This application is a continuation in part of my prior application entitled Mechanism for and Method of Clinching Nuts, filed March 4, 1950, Serial No. 147,718, now abandoned. That application shows substantially the same apparatus as is shown in this application except that I found it advantageous to reshape the channels in the top of the die. In my prior application the nubs were at the deep end of the channels and the channels had closed outer ends which were the shallow ends of the channels. In the present application, the channels have the outer ends the deep portions of the channels and the inner ends are the shallow portions of the channels. This provides the nubs with more acute angles and sharper edges and which more effectively bite into the sides of the nuts.

Figure 2:
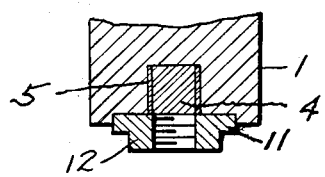
Fig. 2 is a section of a punch provided with a nut held in place by magnetism.
Figure 3:
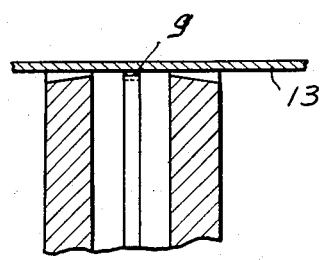
Fig. 3 is a section through a portion of the die and panel about to receive the nut shown in Fig. 2.
Figure 4:
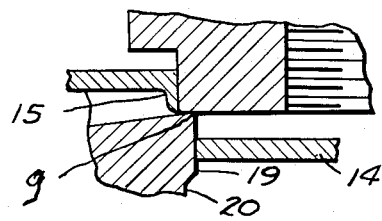
Fig. 4 is a fragmentary section showing how the nut shears through the panel and how the nub on the die is about to enter the unflanged body of the nut and clip or swedge the material off the side of the nut.
Figure 5:
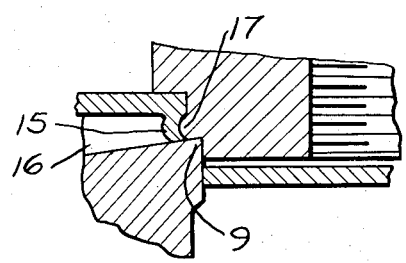
Fig. 5 is a fragmentary section showing the material swedged off the nut and extruded into the channel of the die where it amalgamates and joins the portion of the panel material which has been left above the nub in the shearing operation.
Figure 6:
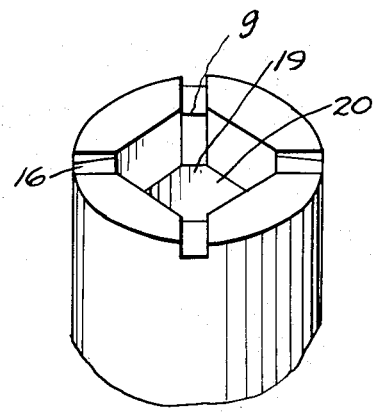
Fig. 6 is a perspective of a die for a square body nut.

These nubs are shown at 9 in the die for the square nut and at 10 for the die for the round nut. The punch 1 bearing the nut with the flange 11 and the square body 12 comes down on the panel 13 as shown in Figs. 2 and 3. The nut and die shear out the piece 14 from the panel and turns the panel spurs 15 down as shown in Fig. 4; then as the nubs 9 bite into the material of the nut the spurs 15 are brought down into the channels 16 and the spur 17 taken from the nut is pushed or extruded into the channel to join the spur 15. The material swedged off in the nut and the turned down spurs of the panel are amalgamated to form the tongues 18 of the clinched nut (see Fig. 1).

Figure 8:
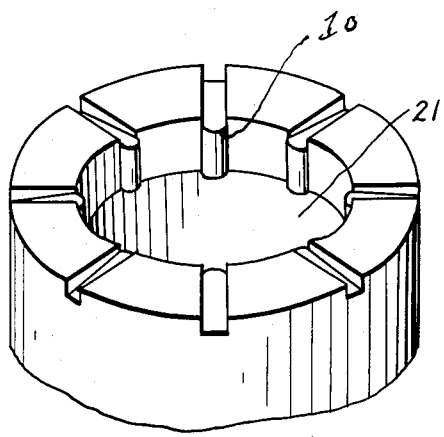
Fig. 8 is a perspective of the die used for a round nut.
Figure 7:
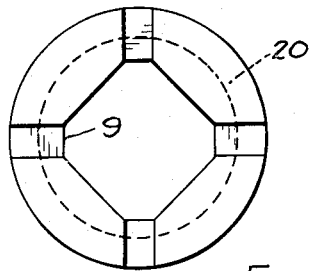
Fig. 7 is a plan view of such a die.
Figure 9:
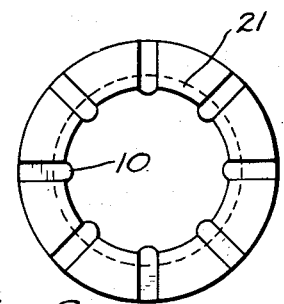
Fig. 9 is a plan view of the same.
Figure 11:
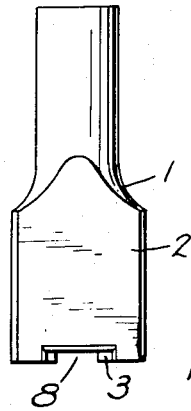
Fig. 11 is a side elevation of the punch.
Figure 10:
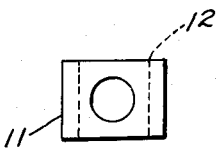
Fig. 10 is a plan view of a flanged nut with a square body.
Figure 13:
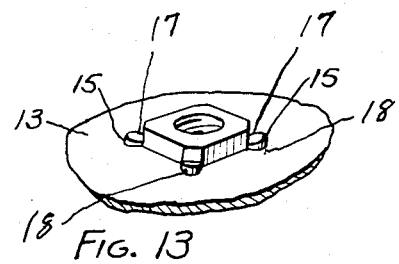
Fig. 13 is a perspective of the nut clinched to a piece of the panel.
Figure 12:
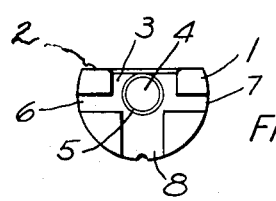
Fig. 12 is an end elevation of this punch.

The nubs 9 in the die for the square nut do not actually project into the hollow material inside of the die as they do with the round die shown at Figs. 8 and 9, for the reason that in the making of the die it is preferable to make the hollow interior of the die for the square body nut by machining the upper part of the die on the interior with 8 faces or approximately octagonal in shape. Below the line 19 the die is cylindrical and the opening is enlarged to facilitate the slug 14 dropping out of the die. The die with the round opening is also enlarged at 21 for the same purpose.

What I claim is:

1. A die cooperating with a nut flanged on one of its faces and with a punch for shearing a hole through a metal panel and clinching the nut in the hole and on the side of the panel removed from the nut flange all in one stroke, said die comprising, a hollow member with channel-like recesses in its top, the hollow being the size and contour of the unflanged portion of the nut and the edges of the die around the end of the hollow die being shearing edges when a punch pushes the nut against the metal of the panel so as to shear a slug of the panel and drop it through the hollow interior of the die, however, the die at spots along its hollow interior departing from the shape of the body of the nut to provide edge portions at the inner ends and bottom of the channel-like recesses in the top of the die, which portions or nubs are located in the interior of the hollow die to be in the path of the body of the nut when it is shearing through the panel to divert or swage a portion off the body of the nut and cause the same to flow outwardly into the channel recesses to thereby clinch the nut to the back of the panel by extruded tongues all in the one shearing and punching operation.

2. A die cooperating with a nut of angular contour and flanged on one of its faces and with a punch for shearing a hole through a metal panel and clinching the nut in the hole on the side of the panel removed from the nut flange all in one stroke, said die comprising a hollow member with channel-like recesses in its top, the hollow being the size and contour of the unflanged portion of the nut except at the corners and the edges of the die around the end of the hollow die being shearing edges when a punch pushes the nut against the metal of the panel so as to shear a slug of the panel and drop it through the hollow interior of the die, however, the die at spots along its hollow interior departing from the shape of the body of the nut to provide edge portions in the inner ends and bottoms of the channel-like recesses in the top of the die, which portions or nubs are located in the interior of the hollow die at the corners of the nut to be in the path of the body of the nut when shearing through the panel to divert or swage portions off the corners of the nut and cause the material to flow outwardly in the channel recesses to thereby clinch the nut to the back of the panel by extruded tongues all in one shearing and punching operation.

3. The method of punching flanged nuts through an unperforated metal panel and clinching said nuts on the back of the panel in one stroke, which comprises pushing the unflanged portion of the nut through the metal of the panel supported by sharp edges of a die, the sharp edges conforming to the contour of the body of the nut except at certain spots, this operation serving to shear a slug out of the panel to form a hole to receive the body of the nut, said spots interposing swedging portions in the die below the shearing edges and in the path of the travel of the nut to swedge off portions of the nut material and extrude it sidewise to clinch the nut on the back of the panel all in one stroke.

4. A die cooperating with a nut flanged on one of its faces and with a punch for holding said nut suspended over the die, the nut itself being used as the cutting point of the punch and shearing a hole through a metal panel and clinching the nut in the hole and on the side of the panel removed from the nut flange all in one stroke, said die comprising, a hollow member with channel-like recesses in its top, the hollow being the size and contour of the unflanged portion of the nut and the edges of the die around the end of the hollow die being shearing edges when the punch pushes the nut against the metal of the panel so as to shear a slug of the panel and drop it through the hollow interior of the die, however, the die at spots along its hollow interior departing from the shape of the body of the nut to provide edge portions at the inner ends and bottom of the channel-like recesses in the top of the die, which portions or nubs are located in the interior of the hollow die to be in the path of the body of the nut when it is shearing through the panel to divert or swage a portion off the panel and the body of the nut and cause the same to flow outwardly into the channel recesses to thereby clinch the nut to the back of the panel by extruded tongues all in the one shearing and punching operation.

References Cited in the file of this patent

UNITED STATES PATENTS

| | | |
|---|---|---|
| 513,655 | Schoen | Jan. 30, 1894 |
| 990,581 | Neider | Apr. 25, 1911 |
| 2,018,683 | Meyer et al. | Oct. 29, 1935 |
| 2,029,341 | Sample et al. | Feb. 4, 1936 |
| 2,174,549 | Blaho | Oct. 3, 1939 |
| 2,308,471 | Schwartz | Jan. 12, 1943 |